Oct. 22, 1968  L. A. WILKINSON  3,407,019
SLIT LAMP

Filed Sept. 23, 1964  6 Sheets-Sheet 1

INVENTOR.
LEONARD A. WILKINSON
BY
Bean, Brooks, Buckley & Bean
ATTORNEYS

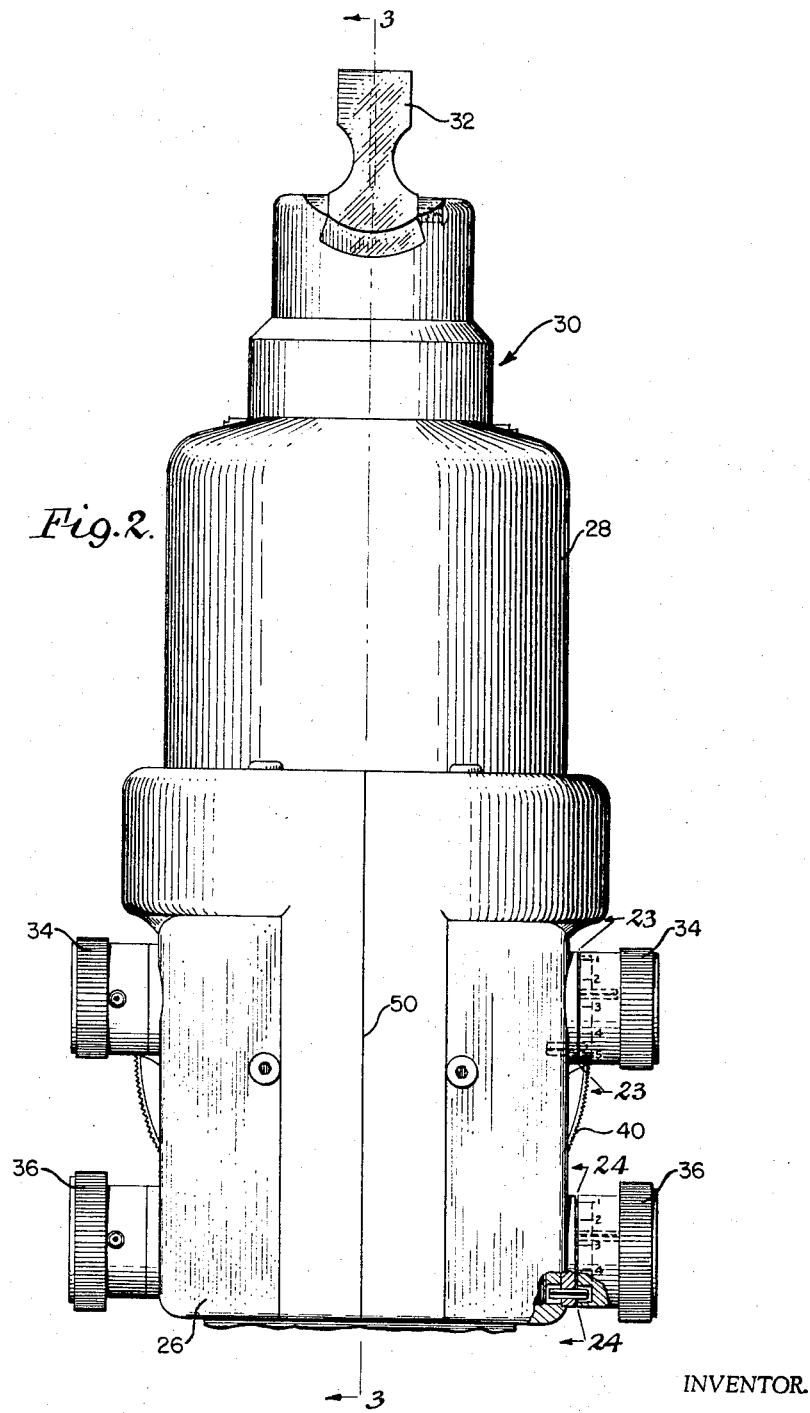

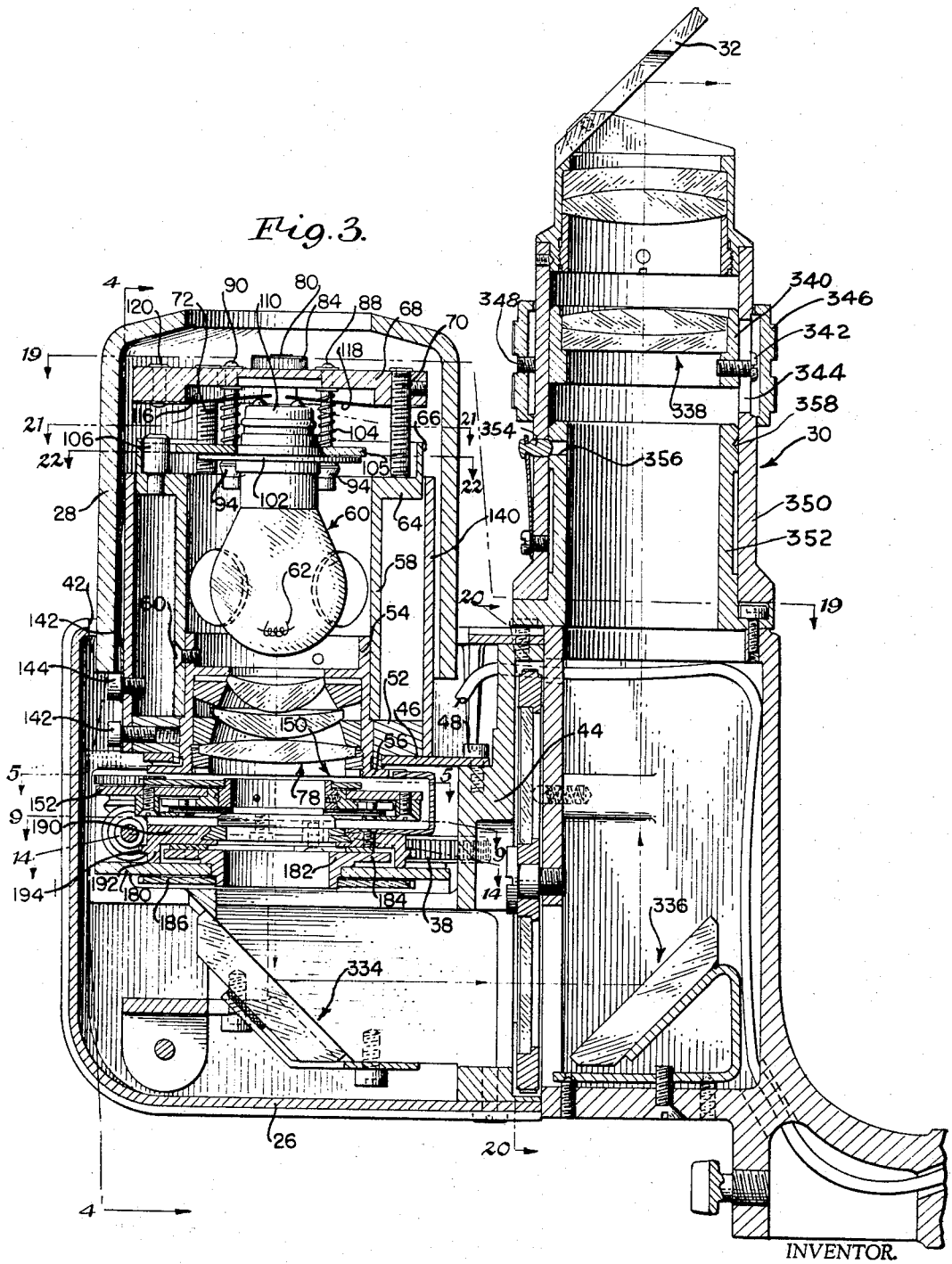

Oct. 22, 1968 L. A. WILKINSON 3,407,019
SLIT LAMP
Filed Sept. 23, 1964 6 Sheets-Sheet 4
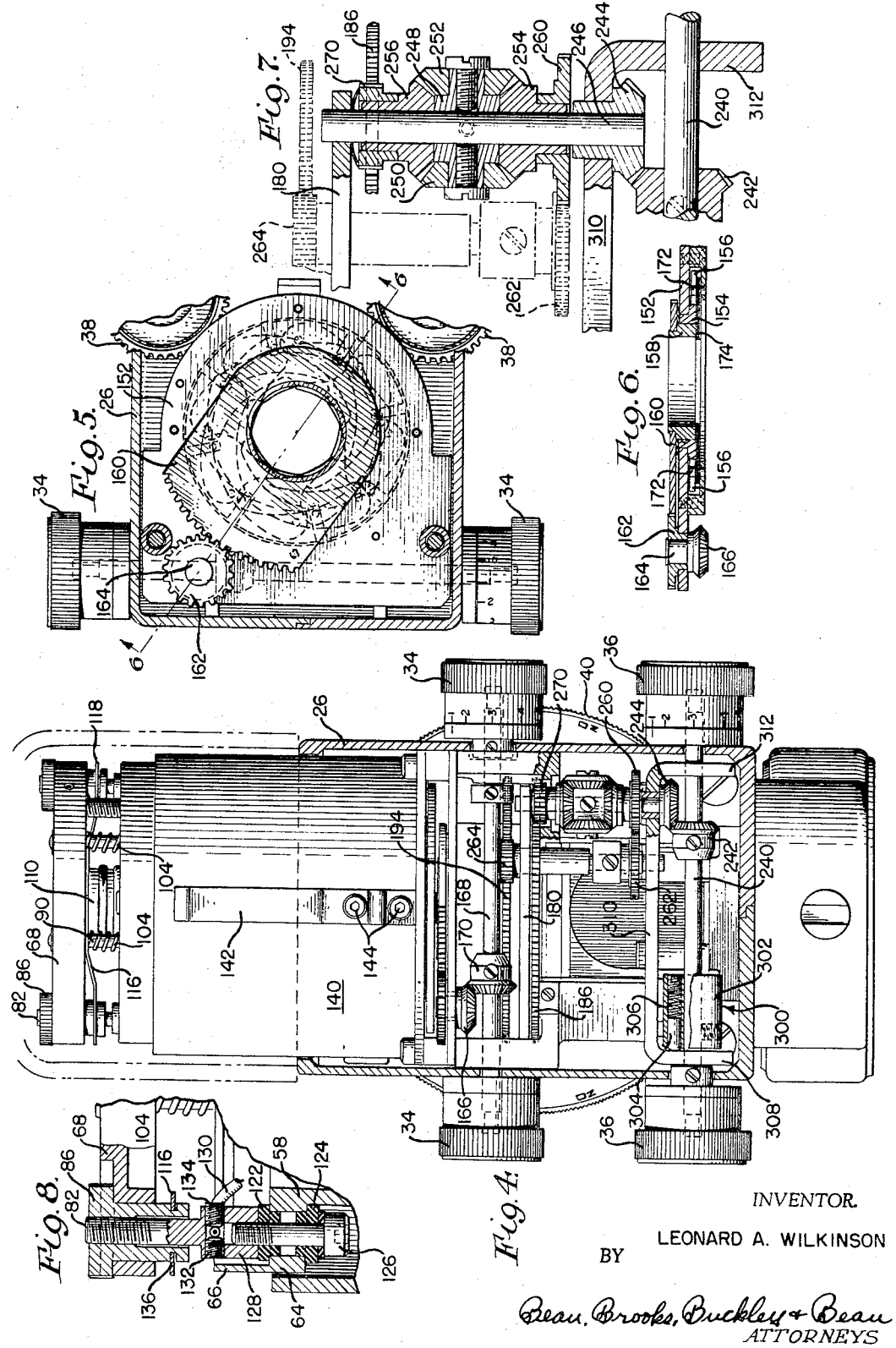
INVENTOR.
LEONARD A. WILKINSON
BY
Bean, Brooks, Buckley & Bean
ATTORNEYS

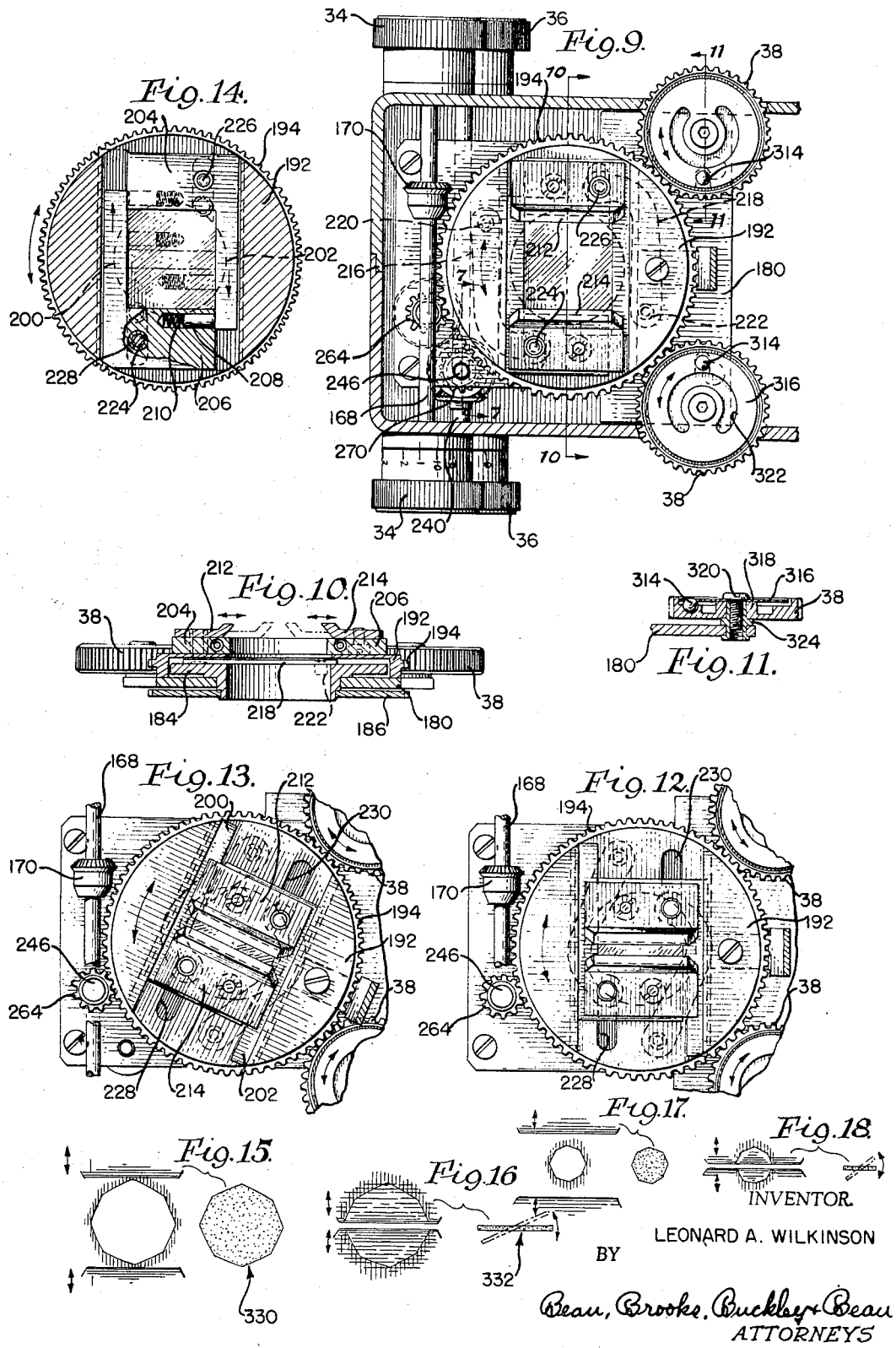

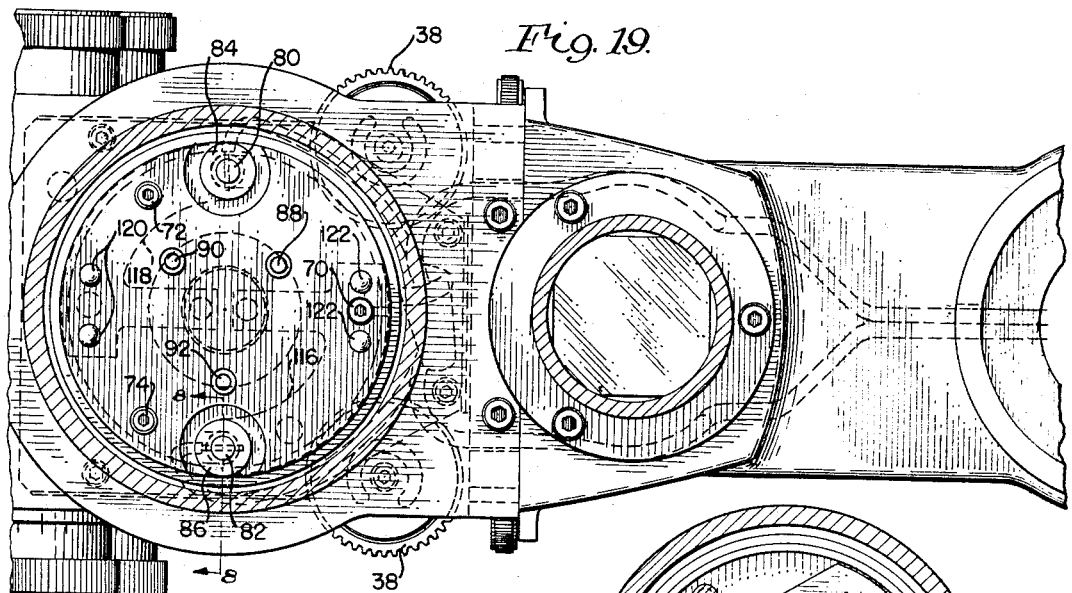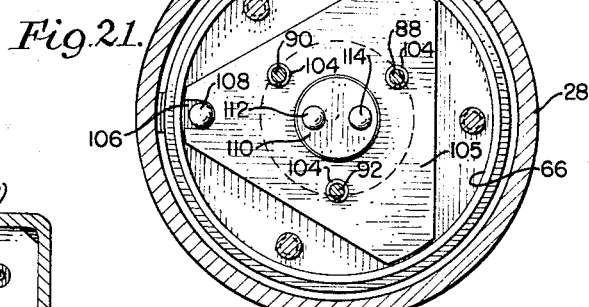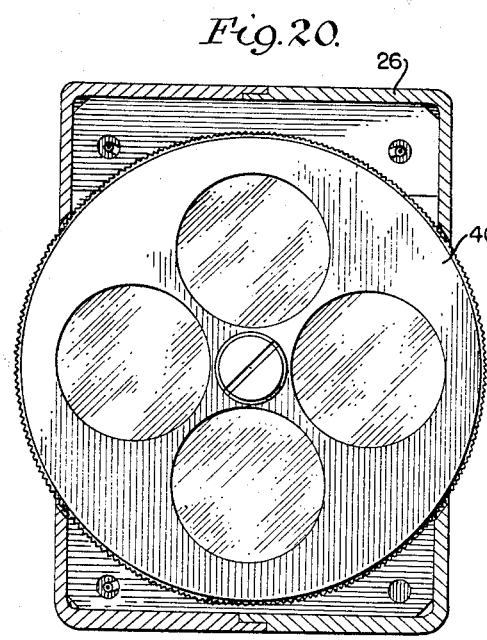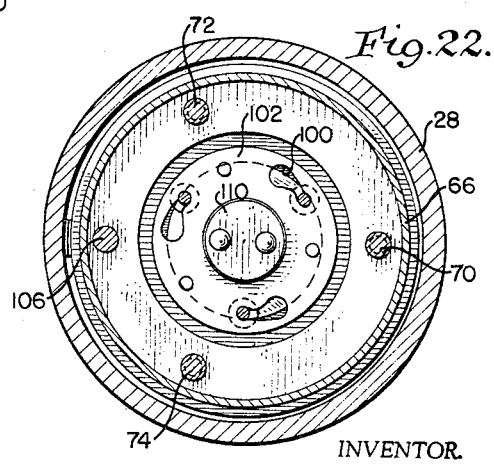

United States Patent Office 3,407,019
Patented Oct. 22, 1968

3,407,019
SLIT LAMP
Leonard A. Wilkinson, Snyder, N.Y., assignor to American Optical Company, Southbridge, Mass.
Filed Sept. 23, 1964, Ser. No. 398,698
2 Claims. (Cl. 351—14)

This invention relates to slit lamp assemblies and, in particular, relates to certain improvements in the arrangement and construction thereof.

The so-called slit lamp is an instrument useful in the field of biomicroscopy and consists of some sort of base or support member carrying positioning mechanisms such as chin and forehead rests for relatively immobilizing a patient's head, a lamp mechanism and associated optical system for projecting a slit or narrow beam of light to and through the patient's pupil, and a microscope for examination of the fundus and vitreous of the eye as illuminated by the slit. As might be expected, it is desirable that the person using the slit lamp assembly be able to control the width as well as the length of the slit formed by the lamp assembly and as projected by its associated optical system. Also, it is desirable that the operator be able to control rotational orientation of the slit about the axis along which the slit image is projected. Moreover, it is desirable that such adjustments and orientation be characterized by simplicity, both in the manner in which they are achieved by the operator and in the manner in which they are physically carried out by the requisite mechanism for producing them. It is, therefore, of primary concern in connection with this invention to provide an improved mechanism for slit lamp assemblies for achieving the above characteristics.

In a more specific sense, it is an object of this invention to provide mechanism of the character described wherein opposed jaw members are disposed within the area of a projected disc of light to pass only a narrow, slit-like beam portion thereof and wherein mechanism for adjusting the spacing between such jaw members is combined with mechanism for rotating such jaw members about the optical axis of the system in such wise and fashion as permits of the adjustment and orientation, as aforesaid, individually and collectively.

Further, it is an object of this invention to provide an improved form of slit lamp assembly, as aforesaid, wherein an adjustable aperture diaphragm assembly is utilized to control the diameter of a projected disc or bundle of light to thereby determine the length of the slit produced by the lamp assembly; wherein adjustable jaw members are provided to narrow the bundle of light in one direction and thereby control the width of the slit; wherein means is provided for rotating the jaw members for orienting the slit rotationally about the optical axis of the system; and wherein the width-controlling mechanism and the orienting mechanism are constructed to cooperate in a novel, simple and yet wholly effective fashion, without requiring clutch elements, gear disengaging mechanisms or the like and which operate in such fashion as to permit either independent or conjoint operations.

A further object of this invention resides in the provision of an improved form of slit lamp assembly incorporating interrelated and cooperating slit width-controlling mechanism and slit orienting mechanism as aforesaid wherein the slit width-controlling mechanism is characterized by harmonic motion inducing mechanism effective to decelerate the rate of width narrowing of the slit as the slit approaches its minimum width.

Another object of this invention is to provide an improved form of slit lamp assembly incorporating an improved arrangement of component parts which places the light source of the assembly in an accessible position and wherein the mounting for the light source mechanism is such as to permit of easy removal and replacement of the source bulb and wherein the filament of the bulb is automatically properly oriented axially of, centrally of, and rotationally with respect to the optical axis of the system.

Other objects and advantages of the invention will appear from the description hereinbelow and the accompanying drawing wherein:

FIG. 2 is a rear elevational view of the assembly shown in FIG. 1;

FIG. 3 is a vertical section taken substantially along the plane of section line 3—3 in FIG. 2 and showing details of internal construction of the lamp assembly;

FIG. 4 is a view taken substantially along the plane of section line 4—4 in FIG. 3 with the cover member removed;

FIG. 5 is a horizontal section taken substantially along the plane of section line 5—5 in FIG. 3 showing mechanism associated with the adjustable iris diaphragms;

FIG. 6 is a vertical section taken through the diaphragm assembly as indicated by section line 6—6 in FIG. 5;

FIG. 7 is an enlarged section taken along the plane as indicated by section line 7—7 in FIG. 9 and showing the adjusting and orienting mechanism;

FIG. 8 is an enlarged sectional view illustrating a portion of the bulb mounting assembly;

FIG. 9 is a horizontal section taken substantially along the plane of section line 9—9 in FIG. 3 and showing details of the jaw assemblies and the motion inducing mechanisms related therewith;

FIG. 10 is an enlarged section taken substantially along the plane of section line 10—10 in FIG. 9 and illustrating the mechanisms for adjusting and orienting the jaw members;

FIG. 11 is a vertical section taken along the plane of section line 11—11 in FIG. 9 and illustrating the friction brake mechanism associated with one of the adjusting means;

FIG. 12 is a view similar to FIG. 9 but illustrating the jaws in narrowed position;

FIG. 13 is a view similar to FIG. 12 but showing the jaws rotated for slit orientation purposes;

FIG. 14 is a horizontal section taken substantially along the plane of section line 14—14 in FIG. 3 and showing details of the mounting mechanism for the jaw members;

FIG. 15 is a view diagrammatically illustrating the cooperation between the iris diaphragm and the jaws;

FIG. 16 is a diagrammatic view illustrating the manner in which the width and length of the slit are determined by the jaws and the iris diaphragm respectively;

FIGS. 17 and 18 are further diagrammatic views illustrating the cooperation between the diaphragm and the jaws;

FIG. 19 is a horizontal section taken substantially along the plane of section line 19—19 in FIG. 3;

FIG. 20 is a vertical section taken substantially along the plane of section line 20—20 in FIG. 3 showing the filter mechanism;

FIG. 21 is a horizontal section taken along the plane of section line 21—21 in FIG. 3 illustrating the means for rotationally orienting the bulb; and FIG. 22 is a horizontal section taken substantially along the plane of section line 22—22 in FIG. 3 showing further details of the bulb mounting mechanism.

Figure 1:
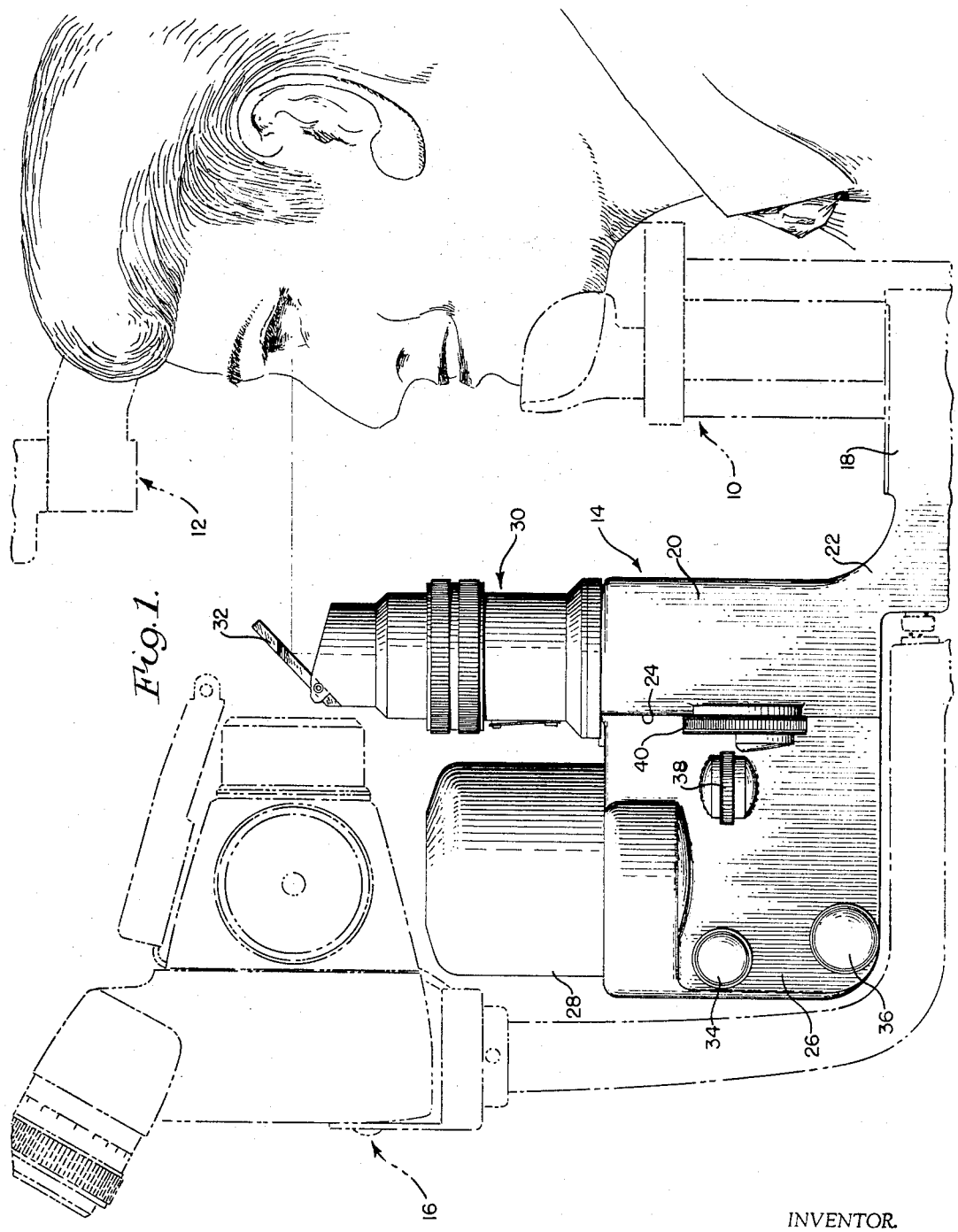
FIG. 1 is a side elevational view showing the lamp assembly according to the present invention in full lines.

With reference now more particularly to FIG. 1, a slit lamp assembly is partially shown therein. Thus, as shown in the figure, the assembly will be seen to include a chin rest 10 and a forehead rest 12 both mounted on a common base assembly (not shown), the purpose of these entities, or their suitable equivalents, obviously being to provide some means for substantially immobilizing the patient's head, as shown. In addition, the assembly includes a lamp housing mechanism indicated generally by the reference character 14 and a microscope assembly indicated generally by the reference character 16, both of which are rotatably mounted about a vertical axis disposed substantially centrally with relation to the hub portion 18 of the lamp housing assembly, the two such entities being independently mounted for rotation about such axis. Moreover, the mechanisms 14 and 16 are mounted for lateral as well as fore and aft and for vertical movement relative to the support assemblies 10 and 12 so that the lamp housing assembly 14 as well as the microscope 16 may be properly positioned relative to the patient.

The lamp housing assembly 14 to which the present invention particularly relates will be seen to include a main body portion 20 having an integral leg 22 to which the aforementioned hub portion 18 is connected or suitable other equivalent mechanism for mounting the assembly 14 as aforesaid. Mounted to the main body portion 20 along the vertical parting line 24 is a casing 26 having an upstanding cover member 28 mounted thereon and, mounted in spaced relationship to the cover 28 is a tube assembly indicated generally by the reference character 30 which carries, at its upper end, the reflex mirror 32 substantially as is shown. Mounted on the casing assembly 26 and within the confines of the cover member 28 is a light source and associated therewith is a suitable condenser assembly for projecting light downwardly through a slit-forming member, such light being impinged upon a suitable member within the casing 26 which relays the light to a further mirror within the main body portion 20 whereafter the light is projected upwardly through the tube assembly 30 to impinge upon the reflex mirror 32 for horizontal projection of the slit image to the patient's eye for examination of the fundus and vitreous by means of the microscope 16 in the well known manner. Thus, the optical path is essentially J-shaped with a horizontal leg extension emanating from the reflex mirror 32. The casing 26 mounts a pair of control knobs 34 and 36 on each side thereof as well as a pair of control wheels 38 and a further control wheel 40. The control knobs 34 are utilized to control mechanism, hereinafter described, for varying the length of the slit image; the control knobs 36 are utilized for varying the width of the slit image; the control wheels 38 are utilized to effect orientation of the slit image; and the control wheel 40 is utilized to interpose various filters within the path of the optical system.

As can be seen in FIG. 3, the casing 26 is provided with an opening 42 in its upper surface through which the lower end of the cover member 28 projects and, internally thereof, the casing is provided with a rib or shoulder 44 to which a mounting plate member 46 is rigidly attached as by means of suitable fasteners 48. To permit assembly of the component parts of the lamp housing assembly, and particularly the components which are disposed within the casing 26, the latter may be formed in separable halves, joined along the parting line 50, see particularly FIG. 2. The mounting plate 46 carries a collar member 52 rigidly affixed thereto which serves as a support for the tube 54 which is provided with a flanged lower end 56 engaging under the collar 52 substantially as is shown. The sleeve member 58 fits over the upper end of the tube 54 and bears against the collar 52, the members 54 and 58 being joined by suitable fasteners such as that indicated by reference character 59, thus firmly mounting the tube 54 and associated sleeve 58. The sleeve 58 serves as a mounting means for the light source indicated generally by the reference character 60 and it is important in connection with this invention that the filament 62 of the light source be properly positioned and oriented to establish a crisp slit image at the proper place. In this regard, it is preferred that the slit image be formed in a vertical plane containing the aforesaid vertical axis about which the assemblies 14 and 16 are rotatably mounted.

To this end, the sleeve 58 is provided with a flange 64 at its upper end so mounted with upstanding angular wall portions 66 which cooperate with a removable base member 68. The base 68 carries a plurality of depending post members 70, 72 and 74, see particularly FIGS. 3 and 19, which are in threaded engagement therewith and which depend from the base to contact the upper surface of the flange 64 on the sleeve 58 so as to achieve vertical positioning of the light source 60 and consequent disposition of the filament 62 thereof at the proper point of the optical axis of the condenser system indicated generally by the reference character 78. The flange 64 carries a pair of upstanding posts 80 and 82 which project through the base 68 and which are threaded for receiving the knurled nut members 84 and 86 which urge the base 68 towards the flange 64. The base 68 also carries a plurality of depending studs 88, 90 and 92 which are rigidly affixed thereto and disposed in depending relationship therefrom and which terminate in bulbous portions such as those indicated by the reference character 94 in FIG. 3. The bulbous portions 94 are of the size to be received through the larger ends of the slots 100 in the mounting flange 102 of the light source 60, see particularly FIG. 22 and each of the members 88, 90 and 92 is provided with the surrounding compression spring 104 for bottoming the flange 102 against the bulbous portions 94. An orienting plate generally of triangular form, as is indicated by the reference character 105 in FIG. 21 is provided with openings receiving the posts 88, 90 and 92 so as to be slidable thereon and it is against this member 105 that the springs 104 bear, as will be readily apparent from FIGS. 3 and 21. One arm of the member 105 is notched as at 106 to receive the stud 108 rigid with the flange 64 of the sleeve 58, reception of the stud 108 in the notch 106 assuring the proper rotational orientation of the filament 62 of the light source 60. Further, the arms of the triangular member 105 are dimensioned to be guidably nested within the upstanding annular wall 66 of the sleeve device 58 so as to approximate a centered condition of the bulb assembly as retained by the mounting mechanism therefor. The base 110 of the light source projects upwardly as shown and is provided with a pair of contact elements 112 and 114 which are engaged by spring contact elements 116 and 118 carried by the mounting base 68. These contacts 116 and 118 are staked, as by rivets 120 and 122 to the base 68, it being appreciated that the base member 68 is formed of suitable dielectric material to avoid short circuiting betwen the two contacts. The provision for electrical connection to the two contacts 116 and 118 is provided for by the mounting posts 80 and 82, one of which is shown in enlarged section in FIG. 8. Each of the posts 80 and 82, as is shown, is insulated from the sleeve member 58 by a pair of suitable dielectric washers 122 and 124, the securing element 126 passing through these washers and being threadedly engaged with the hollow base portion 128 of each post. This base portion of each post is drilled radially to receive the bared portion of an electrical conductor 130 suitably affixed and electrically connected thereto as by set screw elements 132 and 134 substantially as is shown. The retaining nut 84 and 86 in each case is provided with an annular groove 136 receiving the bifurcated end portion of a respective contact 116 or 118 for completing the electrical circuit in each case.

A sleeve 140 surrounds the sleeve 58 and the lower end thereof is fitted over the mounting collar 52 and is suitably secured thereto as by fasteners 142, such sleeve 140 serving to receive the previously mentioned cover member 28. To assure frictional engagement between these two members, a spring clip member 143 may be provided, the same being secured to the sleeve 140 by means of suitable fasteners 144, see particularly FIGS. 3 and 4.

Referring again to FIG. 3, it will be noted that an iris diaphragm assembly indicated generally by the reference character 150 is mounted within the casing 26 immediately below the condenser system 78. This iris diaphragm assembly is shown also somewhat in more detail in FIGS. 5 and 6. Referring to these several figures, it will be noted that the casing 26 mounts a plate member 152 which rotatably supports an actuating wheel 154 having a series of radially extending slots 156 therein. Disposed within the wheel 154 and rigidly affixed thereto is a hub member 158 fixed to a gear sector element 160. The gear sector 160 is in mesh with a spur gear 162 having a hub portion rotatably mounted in the plate 152 and which is fixed to a stub shaft 164 fixed to or integral with the miter gear 166. The two hand knobs 34 are carried at opposite ends of a drive shaft element 168, see particularly FIG. 4, having a miter gear 170 affixed thereto and which is in mesh with the previously mentioned miter gear 166. Consequently, rotation of the shaft 168 by the knobs 34 will cause rotation of the spur gear 162 and consequent movement of the gear sector 160 to impart rotation to the actuating wheel element 154. As a consequence, the pin elements 172 which are disposed within the various slots 156 and are attached to the leaves 174 of the diaphragm assembly will actuate such leaves to constrict or expand the generally circular area defined thereby.

Disposed below the iris diaphragm assembly 150 is the slit forming portion of the mechanism. For the purpose of mounting this portion of the mechanism, the casing 26 carries a further plate 180 which rotatably mounts the hub portion 182 of the lower carrier plate 184. Fixed to the hub 182 below the plate 180 is a gear wheel 186. Disposed on top of the mounting plate 180 is a second carrier plate 190 having a depending skirt 192 provided with a second gear wheel 194 thereon. Which, as can be seen best in FIG. 9, is in mesh with the previously mentioned control wheel 38. The upper side of the carrier plate 190 is diametrically milled to provide opposed keyways (see FIG. 3) receiving the long leg portions 200 and 202 (see FIG. 14) of a pair of sliding blocks. Each of these blocks is also provided with a transverse head portion 204 or 206 which extends transversely to engage against the long leg 200 or 202 of the other block member serving to hold the leg members within their grooves as is shown in FIG. 3. Each of these portions 204 and 206 is provided with a recess receiving a slidable plunger 208 urged by an associated compression spring 210 into contact with the associated leg 200 or 202 to thus take up play which may be present.

The two blocks, as aforesaid, may slide in opposite directions relative to each other within their keyways or slots and the portions 204 and 206 thereof carry jaw members 212 and 214, see particularly FIG. 10, which are movable with the blocks towards each other in the directions of the arrows shown in FIG. 10 to establish, selectively, the width of the slit of light. The manner in which the block members are moved relative to each other is effective by a pair of link elements 216 and 218, see particularly FIGS. 9 and 10. One end of each of the links 216 and 218 is pivotally connected to the carrier plate 184, as indicated by reference characters 220 and 222, whereas the opposite end of each such link is provided with an upstanding pin 224 or 226 which projects upwardly through respective slots 228 and 230 (see particularly FIG. 12) in the upper carrier plate 190 and which are journalled within the respective portions 204 and 206 of the sliding blocks by means of suitable bushings such as those indicated by the reference character 229 in FIG. 14. The bushings 229 also serve to stake the jaws 212 and 214 to the portions 204 and 206. By the arrangement of the links 216 and 218 of the slots 228 and 230, and the manner of interconnecting the jaws 212 and 214 to the lower carrier plate 184 through the links will be seen to effect harmonic motion of the two jaws 212 and 214 in response to rotational movement of the lower carrier plate 184 with respect to the upper carrier plate 190, or vice versa. The arrangement is such that as the jaws 212 and 214 approach a position of closest proximity, the relative movement therebetween takes place at a progressively slower rate, i.e. harmonically, and it is a particular feature of this invention that such motion is achieved between the jaw members 212 and 214. That is to say, it is desirable that the rate of motion of the jaws 212 and 214 be decreasing as the jaws approach each other, in order to permit very precise adjustment of the slit width when the slit is relatively narrow.

As can be seen in FIG. 4, the two hand knobs 36 are rigidly affixed to the opposite ends of the shaft 240 carrying a miter gear 242 thereon. The miter gear 242 is in mesh with a further miter gear 244 keyed or otherwise suitably feathered to an upstanding shaft 246, see particularly FIG. 7. The shaft 246 is rigidly fixed to a differential carrier block 248 which journals a pair of differential side gears 250 and 252 thereon. These side gears 250 and 252 are in mesh with differential gears 254 and 256 which are rotatably received on the shaft 246. The differential gear 254 carrier a spur gear 260 which meshes with a further spur gear 262 rigid with a vertical shaft which carries, at its supper end, a still further spur gear 264. This latter spur gear 264 is in mesh with the upper carrier gear 194, see particularly FIG. 12. The upper differential gear 256 is rigidly fixed to a spur gear 270 which is in mesh with the lower carrier plate gear 186. Thus, it will be appreciated that the upper and lower carrier plate gears 194 and 186 respectively are interconnected by an epicyclic gear train. The purpose for this is to premit independent adjustments of the width slit and of orientation, rotationally, of the slit without interference between these two motions. Thus, rotation of the hand wheels 38 will effect rotation of the upper carrier 190 to cause orientation of the slit rationally without changing the width slit by virtue of the fact that, through the epicyclic gear train, the lower carrier plate 184 is also rotated, in unison, with the upper carrier plate. Conversely, rotation of the hand knobs 36 will rotate the lower carrier plate 184 while leaving the upper carrier plate 190 fixed.

The epicyclic coupligin between the two carrier plates 184 and 190 permits of the aforementioned independent adjustments of the slit width and slit orientation to be made by manipulating the appropriate control members therefor. The epicyclic gear train which connects or couples the two carrier plates is characterized by having two input paths, one of which is controlled by the knobs 36 to effect rotation of the lower carrier plate only while the upper carrier plate is held still, and the other input power path being actuated in response to manipulation of the upper carrier plate by the control wheels 38. In both cases, the same output path is actuated, such output path being connected to the lower carrier plate. Thus, the lower carrier plate is rotated in response to rotation of both the control knobs 36 and the actuating wheels 38. Obviously, with such an arrangement, it is necessary to hold one of the input paths stationary while the other input path is actuated. To accomplish this, drag brake mechanism is associated with each of the input paths. The hand wheels 36 constitute part of one input path; the wheels 38 constitute part of the other input path and the output path is through the gear 256. In terms of the epicyclic gears 250, 252, 254 and 256 themselves, as is shown in FIG. 7, block 248 constitutes one input path while the gear 254 constitutes the other input path, the output path being the gear 256 as previously mentioned. If the input 248 is being rotated, the drag brake acting to hold the gear 254 of the other input stationary will cause rotation of the gears 250 and 252 and consequently of output gear 256 so as to rotate the lower carrier plate 184 through gears 270 and 186. The other input which is to gear 254 is effected in response to rotation of the upper carrier plate 190 which acts through the gear train 194, 264, 262, 260 to rotate the gear 254. At the same time, the drag brake acting to hold the input 248 stationary causes rotation of the gears 250 and 252 to rotate the output gear 256 so that the lower carrier plate 184 moves in unison with the upper carrier plate 190. Thus, the drag brake assembly indicated generally by the reference character 300, see FIG. 4, is provided in association with the shaft 240. Such drag brake takes a form of a body member 302 suitably affixed to a shaft 240 for rotation therewith, and such body 302 carries a plunger 304 urged under the action of the compression spring 306 to bear against the inner face of the leg 308 of a supporting bridge piece. Thus, the drag brake 300 establishes a certain resistance to rotation of the shaft 240 which is sufficient to prevent rotation of the shaft, and consequent actuation of the associated input path of the epicyclic gear train when the other input path of the gear train, as established through the gears 264, 262 and 260 is actuated. For convenience, the bridge piece may include a main body portion 310 and a further leg 312, serving to support a portion of the epicyclic gear train assembly substantially as is shown in FIGS. 4 and 7.

The drag brake assembly associated in conjunction with the other input path of the gear train can be seen most clearly in FIGS. 9 and 11. From FIG. 11, it will be apparent that each of the hand wheels 38 is provided with a counter bore upper face having a recess therein receiving a ball member 314. Secured to the upper face of each of the wheels 38 is a flexible spring washer 316 secured centrally thereof to the hub portion 318 of each wheel by suitable fasteners 320. As can be seen in FIG. 9, each of the spring washers 316 is provided with an arcuate cutaway portion 322 allowing the periphery of the spring washer to flex. The wheel 38 in each case is rotatably mounted on a bushing 324 which is staked, riveted or otherwise fixed to the mounting plate 180 and thus is stationary. Consequently, when the hand wheels 38 are rotated, the spring washers 316 remain stationary and the ball 314 acting in conjunction and bearing against the spring washers will provide a friction brake effect. It will be noted that the spring washer 316 in each case is provided with an opening to receive the ball 314 in one position of rotation for centering this adjustment mechanism, such centering preferably taking place in such position of the slit as is effective to align the slit vertically since this will be the most common orientational adjustment thereof.

FIGS. 15–18 illustrate the manner in which the slit is adjusted. For example, in FIG. 15, it will be seen that the iris diaphragm has been adjusted to permit a relatively wide bundle of light therethrough as is indicated generally by the reference character 330. When the jaws 212 and 214 are narrowed down, as is shown in FIG. 16, the slit, indicated generally by the reference character 332 will be controlled as to its width in accord with the spacing between the jaws 212 and 214 whereas the length of the slit will be determined by the diameter of the bundle of light passing through the iris diaphragm assembly, as indicated by the reference character 330 in FIG. 15. FIGS. 17 and 18 show graphically the manner in which the length of the slit is varied while the width thereof is independently varied by spacing disposition between the jaws 212 and 214.

As can be seen in FIG. 3, two mirrors 334 and 336 are provided to properly direct the slit vertically upwardly within the barrel or tube 30. The barrel 30 carries a secondary condenser system 338 which includes lens elements carried by the collar 340 adjustably mounted for final focusing purposes by means of a lock screw 342 passed through a vertical slot 344 in the tube 30 and engaging the collar 340, as shown. A knurled hand grip 346 covers the screw 342 and slot 344, being secured to the tube 30 by means such as the set screw 348, and also serves as a convenient grip for rotating the tube assembly 30. To this end, it will be seen that the assembly 30 includes the sleeve body 350 rotatably and slidably received on the sleeve boss 352 fixed to the main body of the lamp housing. A spring urged detent member 354 normally "centers" the mirror 32 by reception thereof in the opening 356, but this detent arrangement may be overridden to rotate the mirror 32, whereupon the detent 354 is captive in the groove 358; or, the tube 30 may be bodily removed when desired.

It is to be understood that certain changes and modifications as illustrated and described may be made without departing from the spirit of the invention or the scope of the following claims.

I claim:
1. In a slit lamp assembly, in combination,
a light source and a condenser system optically aligned therewith,
a pair of interconnected carriers having openings centered on the optical axis of said condenser and mounted for rotation about such optical axis,
a pair of jaws having spaced, parallel edges disposed on opposite sides of the optical axis, guide means mounting said jaws on one of said carriers for movement toward and away from each other to vary the spacing between said edges,
cam and projecting means connecting the other carrier to said jaws for moving said jaws in response to relative rotation between said carriers,
a first manually actuated control member connected to said one carrier and an epicyclic drive train for rotating said one carrier to vary the size of the slit between said jaws,
a second manually actuated control member connected to said pair of carriers and to said epicyclic drive train for rotating said carriers in unison to rotate the slit,
said epicyclic drive train connected to said pair of interconnected carriers and having first and second power transmission input paths and a power transmission output path and operable to impart drive to said power transmission output path in response to input drive to either of the power transmission input paths while the other power transmission input path is braked, said drive train including a rotatable driven member, a first driving member, a second driving member, means connecting said first and second driving members to said driven member, means including a drag brake connecting said one carrier to said first driving member and forming, with said first driving member, the first power transmission input path for said epicyclic drive train, and means including a drag brake connecting said second manually actuated control member to said second driving member and forming therewith the second power transmission input path for said epicyclic drive train.

2. In the slit lamp assembly as defined in claim 1 wherein said epicyclic drive train comprises a pair of differential gears, a carrier block, a pair of differential side gears journaled on said carrier block and meshing with said pair of differential gears.

References Cited

UNITED STATES PATENTS

| | | | |
|---|---|---|---|
| 600,688 | 3/1898 | Goodwin | 95—38 |
| 2,304,814 | 12/1942 | Glasser | 351—14 XR |
| 2,485,089 | 10/1949 | Fassin | 350—271 |
| 2,837,963 | 6/1958 | Binstead et al. | 351—1 |
| 3,132,576 | 5/1964 | Mahn | 95—64 |
| 2,396,998 | 3/1946 | Garstang, et al. | 350—272 XR |
| 1,613,658 | 1/1927 | Hanker | 351—14 |
| 2,878,720 | 3/1959 | Chryssanthoo | 350—50 X |

DAVID SCHONBERG, *Primary Examiner.*

P. R. GILLIAM, *Assistant Examiner.*